United States Patent
Bertolotti et al.

(10) Patent No.: US 7,618,571 B2
(45) Date of Patent: Nov. 17, 2009

(54) APPARATUS AND METHOD FOR BLOW MOULDING

(75) Inventors: Gianluca Bertolotti, Ozzero (IT); Mauro Riccio, Ruviano (IT); Mauro Minola, Vigevano (IT)

(73) Assignee: Uniloy Milacron S.r.l., Milan (IT)

( * ) Notice: Subject to any disclaimer, the term of this patent is extended or adjusted under 35 U.S.C. 154(b) by 554 days.

(21) Appl. No.: 11/383,801

(22) Filed: May 17, 2006

(65) Prior Publication Data

US 2007/0246854 A1    Oct. 25, 2007

(51) Int. Cl.
  B29C 47/00 (2006.01)
  B29C 47/16 (2006.01)
  B29C 47/18 (2006.01)
  B29C 47/22 (2006.01)
  B29C 47/24 (2006.01)
  B29C 49/04 (2006.01)

(52) U.S. Cl. .............. 264/167; 425/532; 425/465; 425/467; 264/541; 264/177.16

(58) Field of Classification Search .......... 264/560, 264/540, 541, 167, 177.1, 177.16; 425/522, 425/528, 532, 461, 465, 466, 467
See application file for complete search history.

(56) References Cited

U.S. PATENT DOCUMENTS

| | | | | |
|---|---|---|---|---|
| 3,420,926 A | * | 1/1969 | Winchester, Jr. et al. | 264/167 |
| 3,702,227 A | * | 11/1972 | Hureau | 425/466 |
| 5,356,282 A | * | 10/1994 | Throne et al. | 425/381 |

* cited by examiner

Primary Examiner—Richard Crispino
Assistant Examiner—Martin Rogers
(74) Attorney, Agent, or Firm—John W. Gregg

(57) ABSTRACT

An extrusion head (1) for blow moulding of hollow bodies comprises: a body (2) and a force plug (3) set within the body so as to define a cylindrical gap (4), through which the molten plastic material fed by an extruder can flow; a die opening (6) set at the bottom end of the body (2); a bottom part (30) of the force plug (3), set within the die opening (6) so as to define an annular gap (10) communicating with the cylindrical gap (4) for exit of the tubular parison; and a plunger (20) supporting at the bottom an ovalizing insert (40), slidably mounted within a chamber (32) formed in the bottom part (30) of the force plug. The plunger can pass from a retracted, resting, position, in which the bottom edge (48) of the ovalizing insert is located within the chamber (32), to an extracted, working, position, in which the bottom edge (48) of the ovalizing insert projects at the bottom with respect to the bottom edge (38) of the bottom part of the force plug.

15 Claims, 6 Drawing Sheets

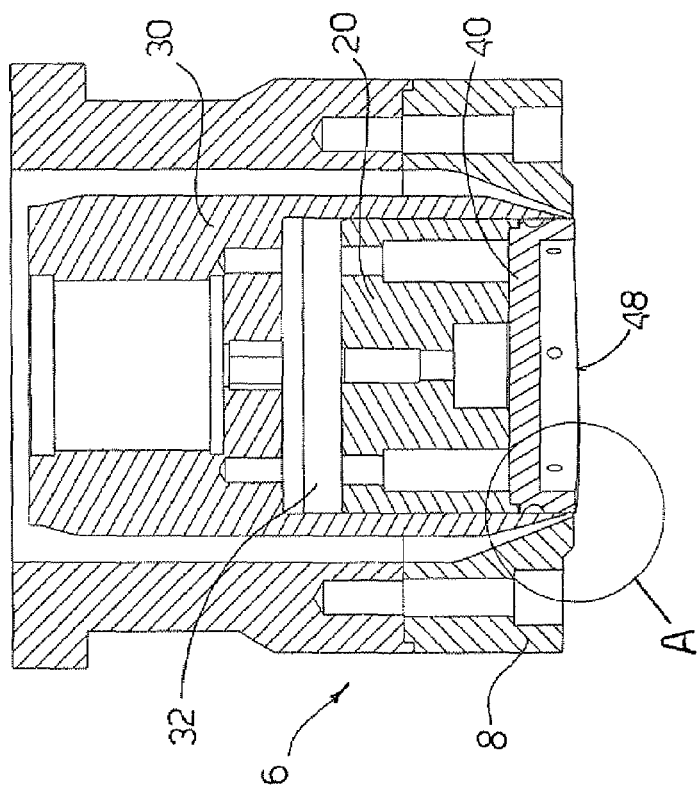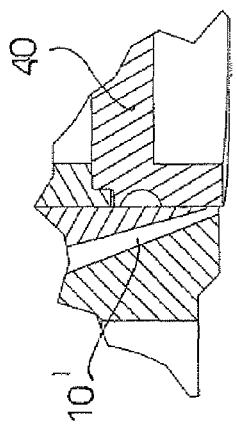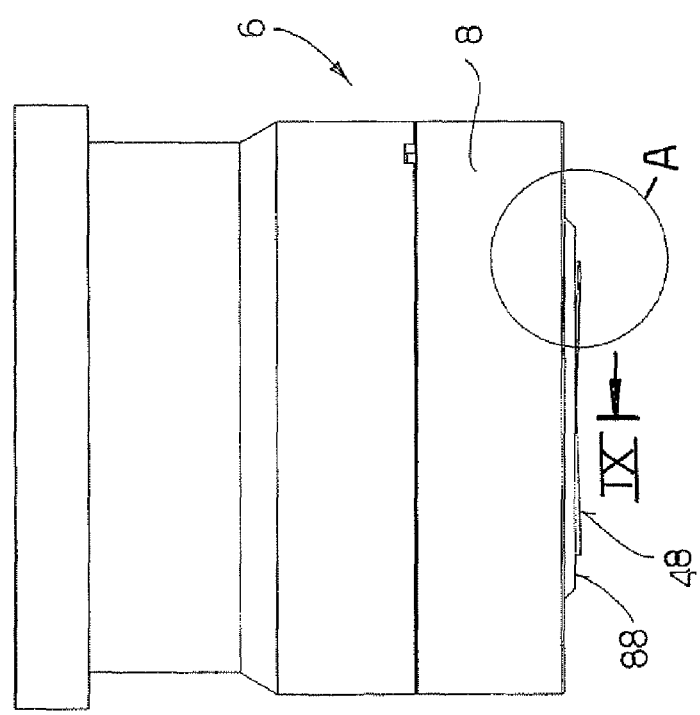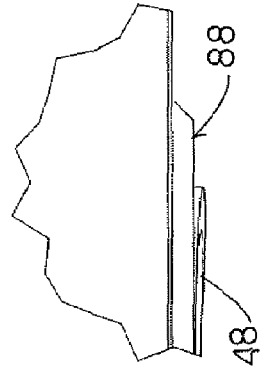

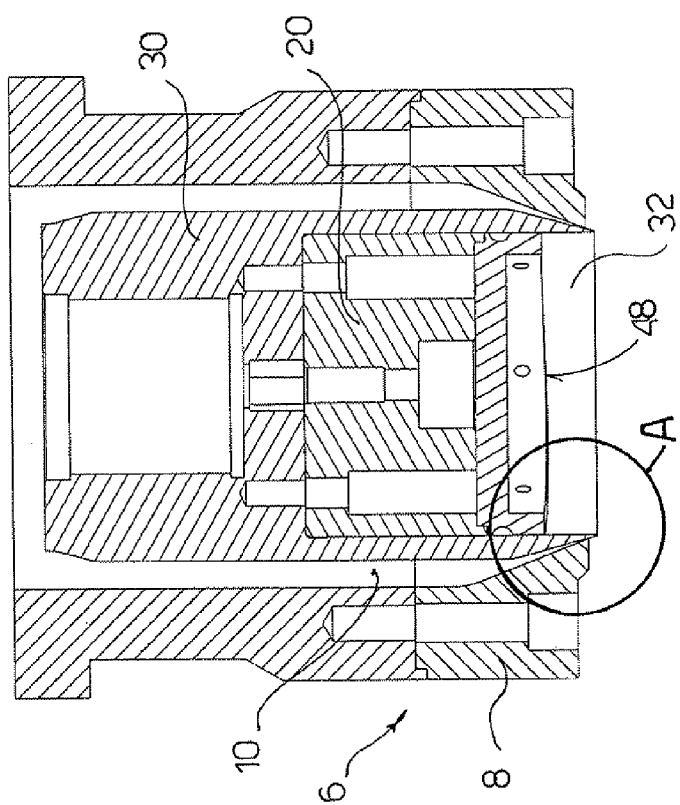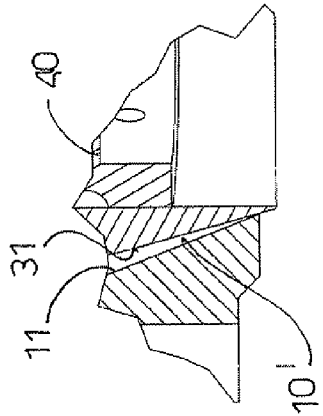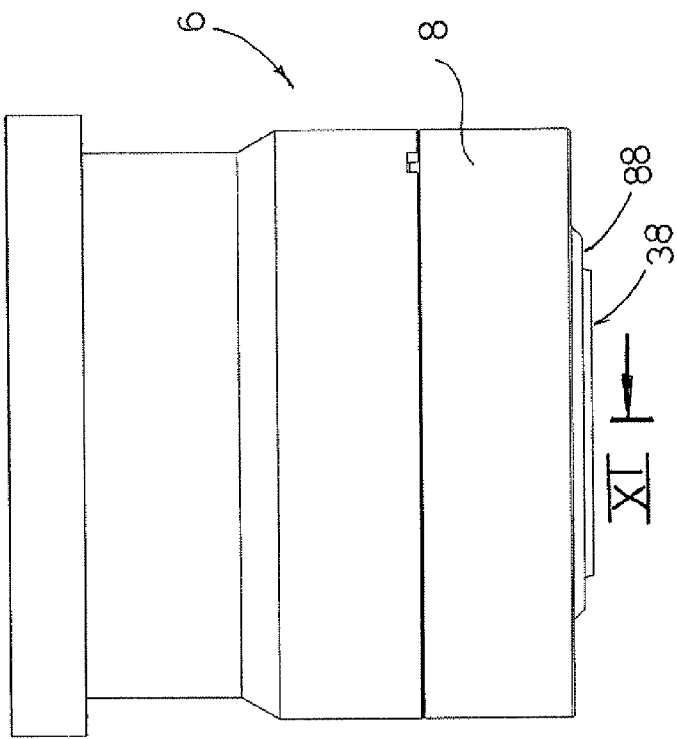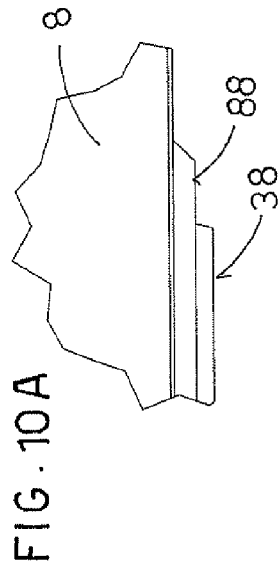

APPARATUS AND METHOD FOR BLOW MOULDING

FIELD OF THE INVENTION

The present invention relates to the sector of machines for blow moulding of polymeric materials with an extrusion head.

DESCRIPTION OF RELATED ART

One of the major problems that are encountered in the blow moulding of hollow bodies is the correct radial distribution of the polymer that forms the final piece. Said problem is much more evident whenever the piece produced does not present cylindrical symmetry, or else when the radii of radiusing of the bottom of the blown product are small.

In fact, when a tubular parison having a constant thickness is blown within the mold, it is found that the semi-molten material distributes in a non-uniform way in the mold. As a result, the final piece will present some portions of wall that are excessively thin and other portions of wall that are excessively thick. To guarantee a certain dimensional stability and strength of the finished piece, it is necessary to increase the weight of the product to obtain a larger thickness in all the walls, with the result of an excessive waste of material.

In order to solve at least in part said drawbacks systems are known, such as the one described in EP 1.004.423 filed in the name of Feuerherm Harald, which intervene in the formation of the parison within the extrusion head to obtain from the head a parison deformed in a pre-set direction. In this way, the subsequent blow moulding of the parison distributes the thicknesses of the walls evenly. The deformation of the parison is obtained by intervening on the mandrel or male set within the extrusion head, namely by replacing the mandrel or by causing deformation of the outer skirt of the mandrel by means of purposely provided plates.

SUMMARY OF THE INVENTION

The purpose of the present invention is to eliminate the drawbacks of the known art by providing an extrusion head for blow moulding of hollow bodies that will enable a uniform distribution of the thickness in the walls of the blown piece to be guaranteed.

Another purpose of the invention is to provide such an extrusion head that will be extremely versatile and designed to be used for different types of production without any need for structural changes.

The above purposes are achieved according to the invention with the extrusion head, the characteristics of which are listed in the annexed independent claim 1.

Advantageous embodiments of the invention appear in the dependent claims.

The extrusion head for blow moulding of hollow bodies according to the invention comprises a body defining within it a substantially cylindrical chamber. Axially set within the chamber of the body is a force plug having a substantially cylindrical shape so as to define a cylindrical gap between the outer side surface of the male or mandrel, also referred to herein as a force plug, and the inner side surface of the body, through which the molten plastic material fed by an extruder can flow.

A die opening is set at the bottom end of the body to define the conformation of the outer side surface of the parison. A bottom part of the mandrel is set within the die opening so as to define an annular gap communicating with the first cylindrical gap for exit of the tubular parison from the extrusion head.

The main characteristic of the invention is represented by the fact that the extrusion head further comprises a plunger supporting, at the bottom, an ovalizing insert. The plunger is slidably mounted axially within a chamber formed in the bottom part of the force plug and open downwards. In this way, the plunger can move from a retracted, resting, position, in which the bottom edge of the ovalizing insert is located within the chamber of the bottom part of the force plug, to an extracted, working, position, in which the bottom edge of the ovalizing insert projects at the bottom with respect to the bottom edge of the bottom part of the force plug.

In this way, the bottom edge of the ovalizing insert that projects at the bottom from the bottom part of the mandrel enables adjustment of the radial distribution of the internal surface of the polymer. Since the bottom edge of the ovalizing insert is asymmetrical, whereas the bottom edge of the die opening is symmetrical, there will be an appropriate distribution of the thickness of the parison, in compliance with the production requirements and the subsequent process of blow moulding in the mold.

The advantages of the invention are clearly evident in that it enables, via control of the movement of the plunger, adjustment of the travel of the ovalizing insert in conformance with the production requirements.

Further characteristics of the invention will emerge more clearly from the ensuing detailed description, with reference to its embodiments, which are provided purely by way of non-limiting example and are illustrated in the annexed drawings, wherein:

BRIEF DESCRIPTION OF THE DRAWINGS

FIG. 8 is a side view of the bottom part of the head of FIG. 1, when the force plug of the extrusion head is in the raised, working, position and the plunger of the ovalizing insert is in the extracted, working, position;

FIG. 8A is an enlargement of the detail enclosed in the circle A of FIG. 8;

FIG. 9 is an axial cross-sectional view taken according to the sectional plane IX-IX of FIG. 8;

FIG. 9A is an enlargement of the detail enclosed in the circle A of FIG. 9;

FIG. 10 is a side view of the bottom part of the head of FIG. 1, when the force plug of the extrusion head is in the lowered, resting, position and the plunger of the ovalizing insert is in the retracted, resting, position;

FIG. 10A is an enlargement of the detail enclosed in the circle A of FIG. 10;

FIG. 11 is an axial cross-sectional view taken according to the sectional plane XI-XI of FIG. 10; and FIG. 11A is an enlargement of the detail enclosed in the circle A of FIG. 11.

DETAILED DESCRIPTION

Figure 1:
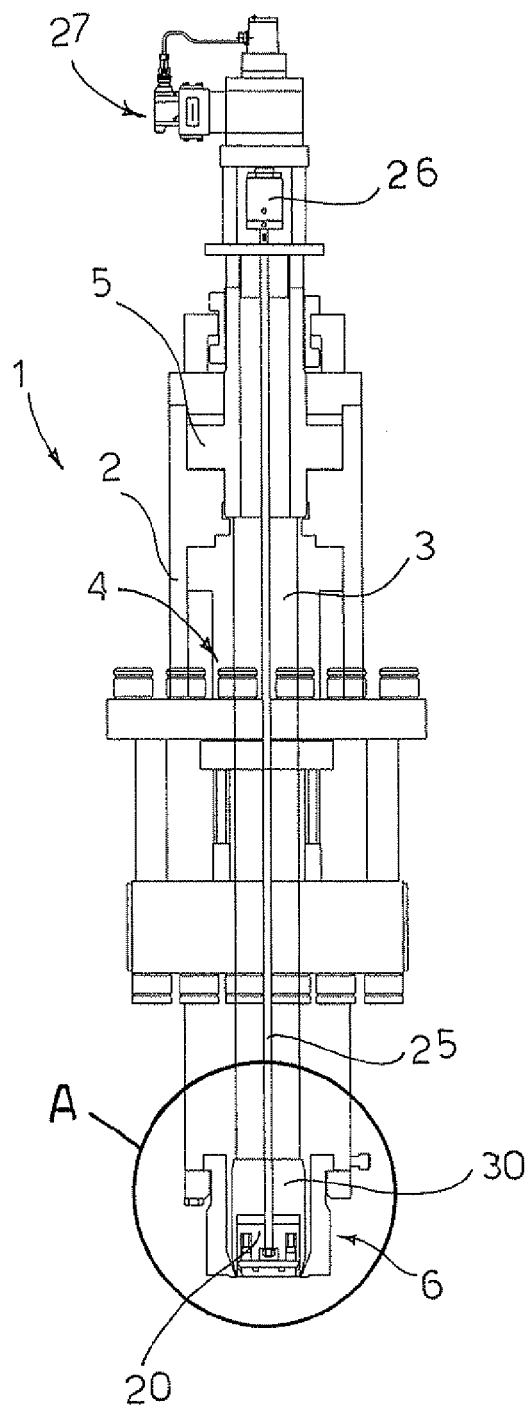
FIG. 1 is the layout in side elevation of a complete extrusion head according to the invention.

With reference now to FIG. 1, illustrated therein is an extrusion head according to the invention, designated as a whole by the reference number 1. The extrusion head 1 has a substantially cylindrical body 2. A substantially cylindrical male or mandrel 3, also referred to herein as force plug 3, is axially set within the body 2.

Between the internal wall of the body 2 of the head and the external wall of the male 3 a cylindrical gap 4 is formed, through which the molten material fed into the head by an extruder (not shown) can flow downwards through a manifold 5 set within the head. In this way, the molten material in the cylindrical gap 4 assumes a substantially tubular shape.

Located at the bottom end of the head 1 is a die opening 6, set within which is the bottom part 30 of the force plug 3. According to the configuration of the die opening 6 and of the bottom part 30 of the mandrel 3 is the shape of the parison that must come out of the extrusion head 1 to be subsequently blown in the mold.

With reference also to FIGS. 1A, 2, 3 and 3A, the die opening 6 comprises a first, cylindrical, element 7, fixed to the body 2 of the extrusion head, and a second, annular, element 8, fixed to the cylindrical element 7 by means of fixing screws that engage in respective fixing holes 9 made in the cylindrical element 7 and in the disk-like element 8 of the die opening 6.

Defined between the outer side surface of the bottom part 30 of the mandrel 3 and the inner side surface of the cylindrical element 7 of the die opening is a cylindrical gap 10 communicating with the cylindrical chamber 4 for passage of the molten material. The cylindrical gap 10 is narrowed within the annular terminal element 8 of the die opening.

The annular element 8 has a tapered inner side surface 11 with an internal diameter that decreases downwards. Also the bottom end of the terminal element 30 of the force plug 3 has a tapered outer side surface 31 with an internal diameter that decreases downwards. In this way, between the two tapered surfaces 11 and 31 a narrowing 10' of the cylindrical gap 10 is created.

Made in the bottom part 30 of the force plug 3 is a cylindrical chamber 32 open at the bottom. A plunger 20 can slide axially within the cylindrical chamber 32 of the force plug 3.

Figure 1A:
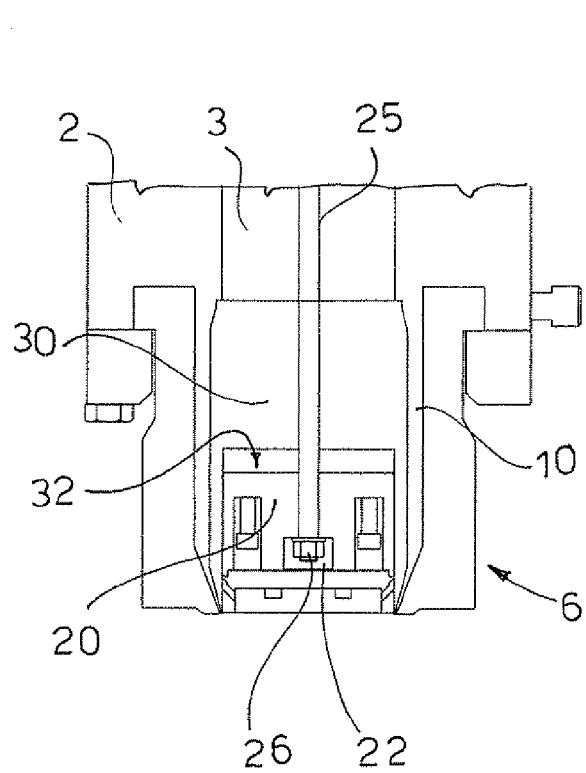
FIG. 1A is an enlarged detail enclosed in the circle A of FIG. 1.
Figure 2:
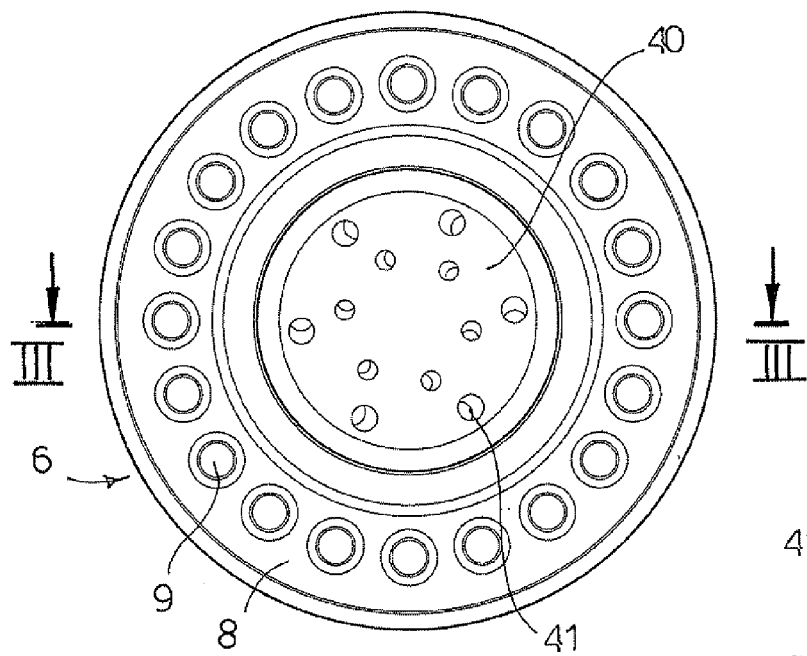
FIG. 2 is a plan view from beneath of the die opening of the extrusion head of FIG. 1.
Figure 3A:
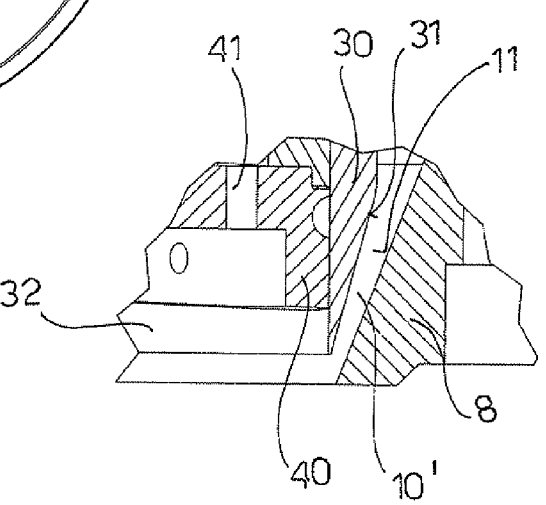
FIG. 3A is an enlargement of the detail enclosed in the circle A of FIG. 3.
Figure 3:
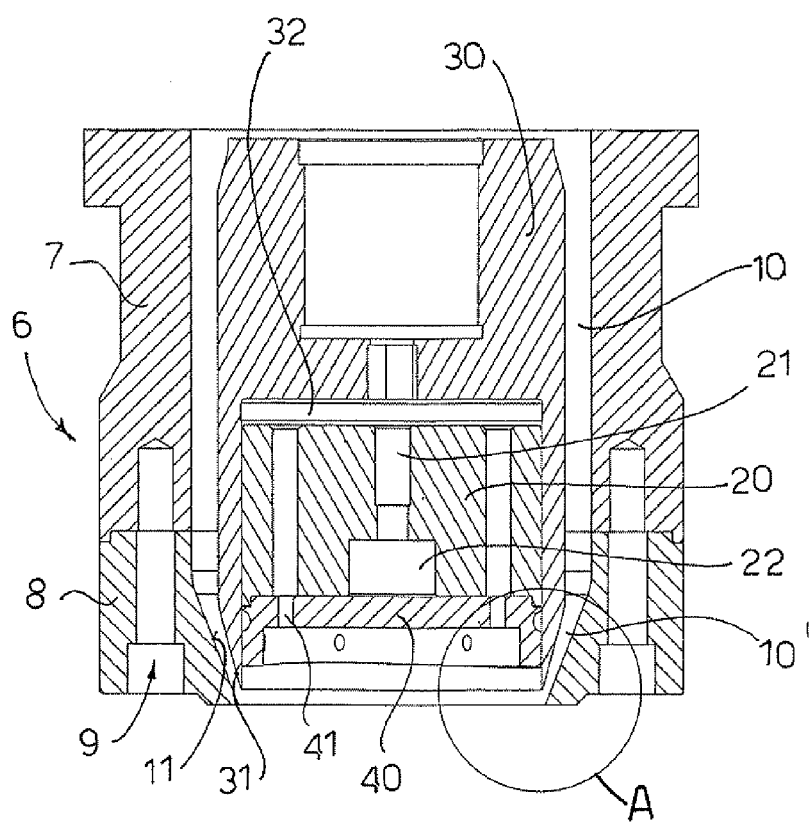
FIG. 3 is an axial cross-sectional view taken according to the sectional plane III-III of FIG. 2 of the die opening of the extrusion head of FIG. 1.

The plunger 20 has an axial hole 21 ending in a widened seat 22. With reference also to FIGS. 1 and 1A, a stem 25, the bottom end of which is fixed to the plunger 20 by means of a nut 26 housed in the seat 22 of the plunger 20, passes in the axial hole 21 of the plunger 20. As illustrated in FIG. 1, the plunger 25 extends axially within the force plug 3; for said purpose, the force plug 3 must present an axial channel designed to enable passage of the stem 25 of the plunger.

The top end of the stem 25 is located in the top part of the extrusion head 1 and is connected to an actuator 26, which enables axial translation of the stem 25. The actuator 26 is controlled by a purposely provided controller 27.

Fixed to the bottom surface of the plunger 20 is an ovalizing insert 40. The ovalizing insert 40 has a plurality of fixing holes 41, designed to be aligned with fixing holes of the plunger for receiving fixing screws.

Figure 4:
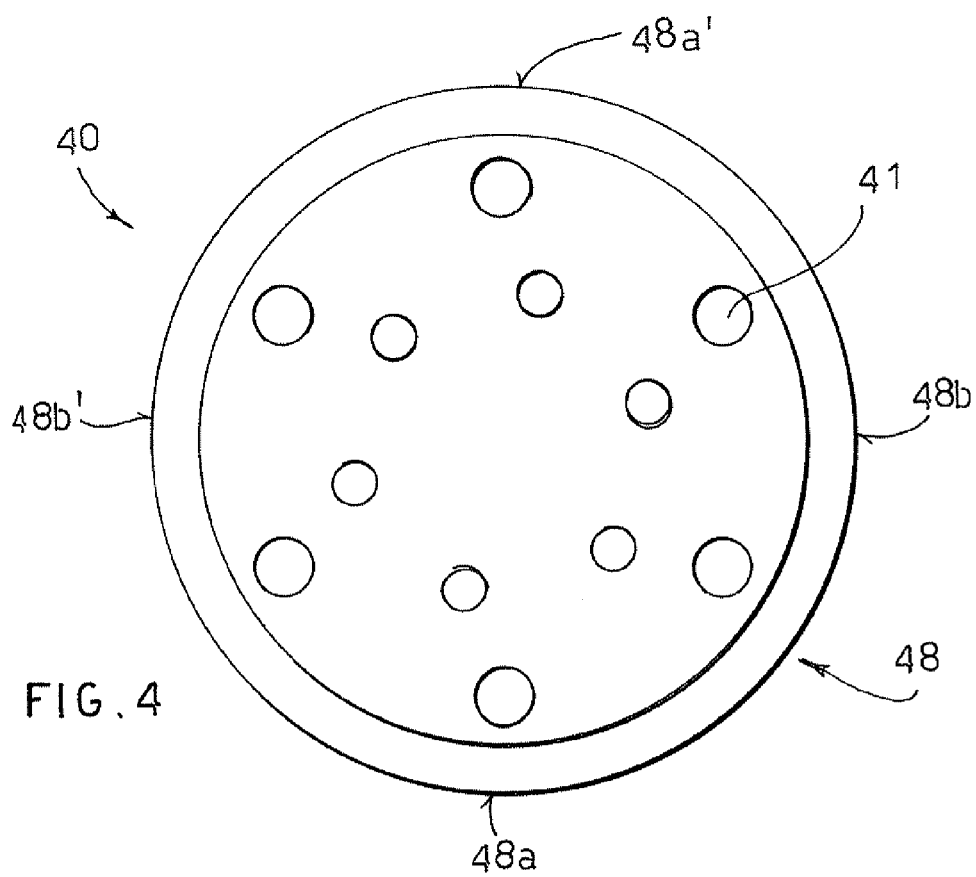
FIG. 4 is a bottom plan view of an ovalizing insert of the extrusion head of FIG. 1.
Figure 5:
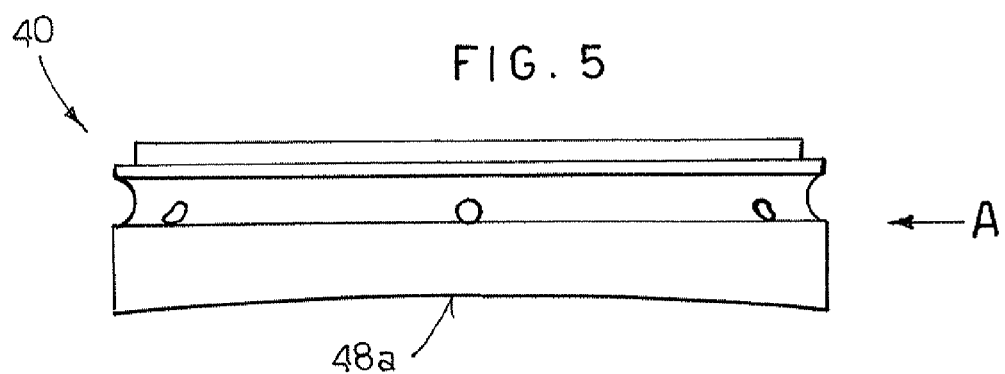
FIG. 5 is a side view of the ovalizing insert of FIG. 4.
Figure 5A:
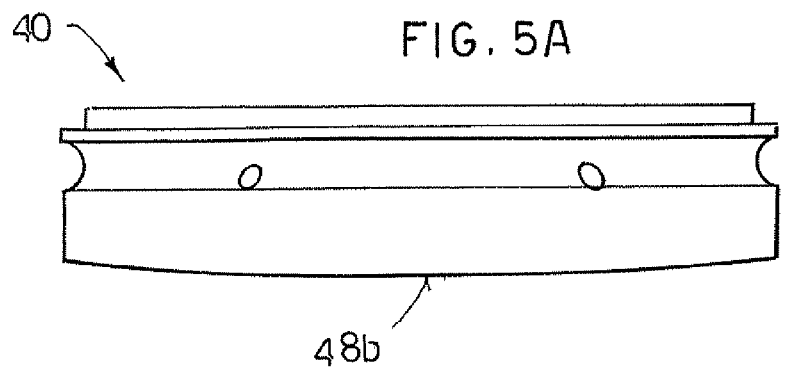
FIG. 5A is a side view of the ovalizing insert taken according to the direction of the arrow A of FIG. 5.
Figure 7:
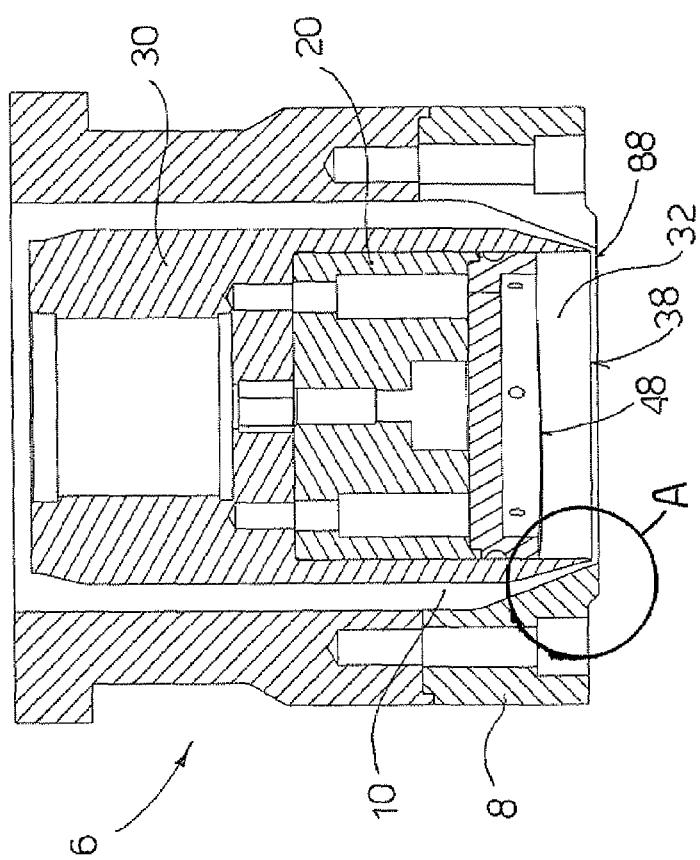
FIG. 7 is an axial cross-sectional view taken according to the sectional plane VII-VII of FIG. 6.
Figure 7A:
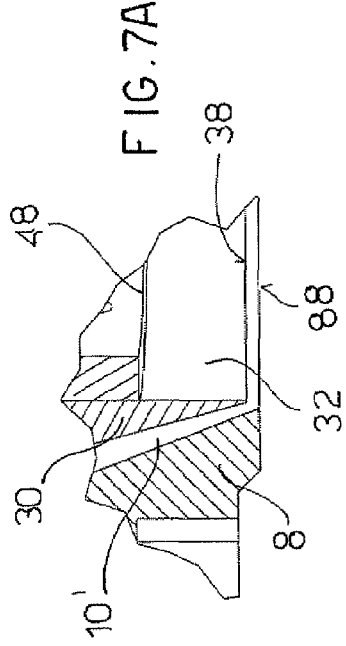
FIG. 7A is an enlargement of the detail enclosed in the circle A of FIG. 7.
Figure 6:
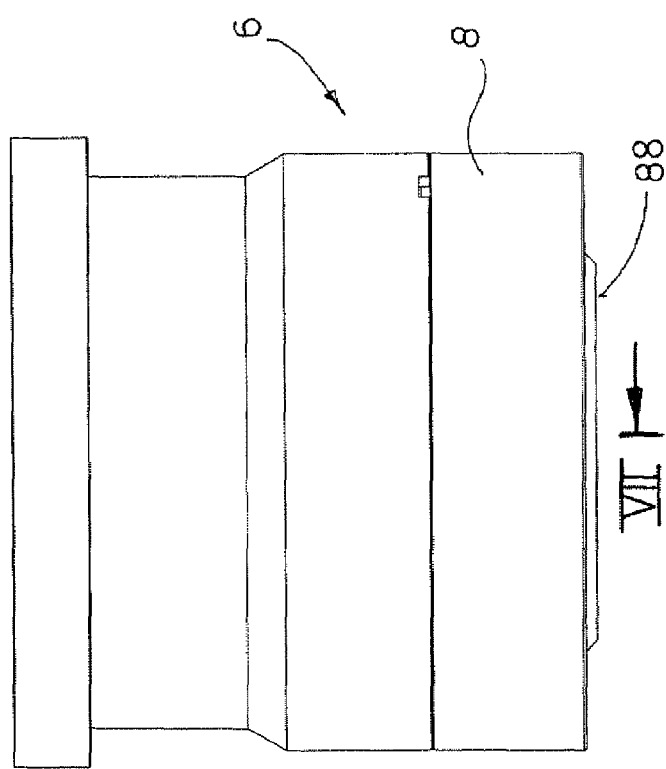
FIG. 6 is a side view of the bottom part of the head of FIG. 1, when the force plug of the extrusion head is in the raised, working, position and the plunger of the ovalizing insert is in the retracted, resting, position.
Figure 6A:
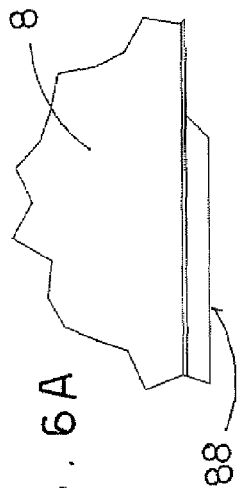
FIG. 6A is an enlargement of the detail enclosed in the circle A of FIG. 6.

As illustrated in FIGS. 4, 5 and 5A, the ovalizing insert 40 has a substantially disk-like shape, with an external diameter substantially equal to that of the plunger 20 in order to be able to slide in the chamber 32 of the force plug 3. The outer bottom edge 48 of the ovalizing insert 40 has an asymmetrical profile and is divided into four portions of arc of circle 48a, 48b, 48a', 48b' subtending an angle at the centre of 90°. To be exact, as illustrated in FIGS. 5 and 5A, there are two portions of outer bottom edge with convex profile 48a, and 48a', arranged in diametrically opposite positions, and two portions of outer bottom edge with concave profile 48b, and 48b', arranged in diametrically opposite positions.

With reference to FIGS. 6, 6A, 7 and 7A, the plunger 20 is in its retracted, resting, position and the force plug 3 is in the lowered, working, position. In this situation, the plunger 20 is retracted within the chamber 32 of the bottom part 30 of the force plug 3 and the bottom edge 48 of the ovalizing insert 40 does not project externally with respect to the bottom edge 38 of the bottom part 30 of the force plug 3. The force plug 3 is lifted, and the bottom part 30 of the force plug 3 is within the die opening 6; consequently, the bottom edge 38 of the bottom part of the force plug 3 does not project externally with respect to the bottom edge 88 of the die opening 6.

The molten material can pass through the narrowing 10' of the gap 10 so as to form, at output from the die opening 6, a tubular parison with substantially constant thickness, since both the bottom edge 38 of the force plug 3 and the bottom edge 88 of the die opening 6 are circular and symmetrical. Consequently, no control over the thickness of the parison is performed.

If the aim is to perform a control over the thickness of the parison, the controller 27 (FIG. 1) controls the actuator 26, which actuates the stem 25, thus causing a translation downwards of the plunger 20.

After said translation (see FIGS. 8, 8A, 9 and 9A), the plunger 20 is in its extracted, working, position, and also the bottom part 30 of the force plug 3 is in the raised, working, position. In this situation, the bottom edge 48 of the ovalizing insert 40 projects externally downwards both with respect to the bottom edge 38 of the bottom part 30 of the force plug 3 and with respect to the bottom edge 88 of the die opening 6.

The molten material can pass through the narrowing 10' of the gap 10; however, in this case, the internal surface of the molten material comes into contact with the outer bottom edge 48 of the ovalizing insert 40.

Since the outer bottom edge 48 of the ovalizing insert is asymmetrical and has convex portions 48a, 48a' and concave portions 48b, 48b', the internal surface of the parison at output from the die opening 6 is ovalized. As a result, the parison will have a larger thickness at the convex parts 48a, 48a' of the ovalizing insert 40 and a smaller thickness at the concave parts 48b, 48b' of the ovalizing insert.

Subsequently, when the parison with non-uniform thickness is blown in the mold, there will be an even distribution of the thickness of the side walls of the finished product.

It should be considered that the force plug 3 can translate axially within the head 1 to move from a raised, working, position, in which the narrowing 10' of the gap 10 is open for passage of the molten material, to a lowered, resting, position, in which the narrowing 10' of the gap 10 is closed so as to obstruct passage of the molten material outwards.

With reference to FIGS. 10, 10A, 11, 11A, when it is necessary to stop production, the plunger 20 is brought back into its retracted, resting, position within the chamber 32 of the bottom part 30 of the force plug 3, and the force plug 3 is actuated in translation downwards so as to bring the tapered outer wall 31 of the bottom part 30 of the force plug 3 into contact with the tapered inner wall 32 of the die opening 6. In this way, the narrowing 10' of the gap 10 is closed, and the molten material cannot come out of the die opening 6.

It should be noted that in this situation the bottom edge 38 of the bottom part 30 of the force plug 3 projects slightly downwards with respect to the bottom edge 88 of the bottom part 8 of the die opening 6.

Numerous variations and modifications of a particular nature can be made to the present embodiment of the invention, all of which fall within the reach of a person skilled in the art and in any case within the scope of the invention, as expressed in the annexed claims.

What is claimed is:

1. An extrusion head for blow moulding of hollow bodies comprising:
   a) a body defining within it a substantially cylindrical chamber;
   b) a force plug having a substantially cylindrical shape and set axially within said cylindrical chamber of the body so as to define a cylindrical gap between the outer side surface of the force plug and the inner side surface of the body, through which the molten plastic material fed by an extruder can flow;
   c) a die opening set at the bottom end of the body; and
   d) a bottom part of the force plug set within said die opening so as to define an annular gap communicating with said cylindrical gap for exit of the tubular parison from said extrusion head,
   e) said extrusion head further comprising:
      i) a plunger supporting at the bottom an ovalizing insert having a substantially annular shape and comprising an asymmetrical bottom edge presenting portions with convex profile and portions with concave profile, said plunger being slidably mounted axially within a chamber formed in said bottom part of the force plug and open downwards, so that said plunger can pass from a retracted, resting, position, in which the bottom edge of the ovalizing insert is within said chamber of the bottom part of the force plug, to an extracted, working, position, in which the bottom edge of said ovalizing insert projects at the bottom with respect to the bottom edge of said bottom part of the force plug.

2. The extrusion head according to claim 1, wherein said force plug is mounted so as to be axially translatable within said body of the head to pass from a raised, working, position, in which said annular gap formed between the bottom part of the force plug and the die opening is kept open, and a lowered, resting, position, in which said annular gap formed between the bottom part of the force plug and the die opening is closed.

3. The extrusion head according to claim 2, wherein said die opening comprises a bottom part, which has a tapered inner side surface with a radius that decreases downwards, and in that said bottom part of the force plug comprises a tapered outer side surface with a diameter that decreases downwards so as to generate a restriction of said annular gap for passage of the molten plastic material.

4. The extrusion head according to claim 2, wherein said plunger is connected to a stem, which axially traverses said force plug, to be actuated in translation by an actuator set in the top part of said extrusion head.

5. The extrusion head according to claim 4, wherein said die opening comprises a bottom part, which has a tapered inner side surface with a radius that decreases downwards, and in that said bottom part of the force plug comprises a tapered outer side surface with a diameter that decreases downwards so as to generate a restriction of said annular gap for passage of the molten plastic material.

6. The extrusion head according to claim 1, wherein said ovalizing insert has two portions with convex profile arranged in diametrically opposite positions and two portions with concave profile arranged in diametrically opposite positions.

7. The extrusion head according to claim 6, wherein said force plug is mounted axially translatable within said body of the head to pass from a raised, working, position, in which said annular gap formed between the bottom part of the force plug and the die opening is kept open, and a lowered, resting, position, in which said annular gap formed between the bottom part of the force plug and the die opening is closed.

8. The extrusion head according to claim 7, wherein said die opening comprises a bottom part, which has a tapered inner side surface with a radius that decreases downwards, and in that said bottom part of the force plug comprises a tapered outer side surface with a diameter that decreases downwards so as to generate a restriction of said annular gap for passage of the molten plastic material.

9. The extrusion head according to claim 6, wherein said plunger is connected to a stem, which axially traverses said force plug, to be actuated in translation by an actuator set in the top part of said extrusion head.

10. The extrusion head according to claim 6, wherein said die opening comprises a bottom part, which has a tapered inner side surface with a radius that decreases downwards, and in that said bottom part of the force plug comprises a tapered outer side surface with a diameter that decreases downwards so as to generate a restriction of said annular gap for passage of the molten plastic material.

11. The extrusion head according to claim 6, wherein said portions with convex and concave profiles has the form of the arc of a circle subtending an angle of 90°.

12. The extrusion head according to claim 1, wherein said die opening comprises a bottom part, which has a tapered inner side surface with a radius that decreases downwards, and in that said bottom part of the force plug comprises a tapered outer side surface with a diameter that decreases downwards so as to generate a restriction of said annular gap for passage of the molten plastic material.

13. The extrusion head according to claim 1, wherein said plunger is connected to a stem, which axially traverses said force plug, to be actuated in translation by an actuator set in the top part of said extrusion head.

14. The extrusion head according to claim 13, wherein said die opening comprises a bottom part, which has a tapered inner side surface with a radius that decreases downwards, and in that said bottom part of the force plug comprises a tapered outer side surface with a diameter that decreases downwards so as to generate a restriction of said annular gap for passage of the molten plastic material.

15. A method for controlling the thickness of the walls of a parison coming out of an extrusion head comprising a body defining within it a substantially cylindrical chamber; a force plug having a substantially cylindrical shape and set axially within said cylindrical chamber of the body so as to define a cylindrical gap between the outer side surface of the force plug and the inner side surface of the body, through which the molten plastic material fed by an extruder can flow; a die opening set at the bottom end of the body; and a bottom part of the force plug set within said die opening so as to define an annular gap communicating with said cylindrical gap for exit of the tubular parison from said extrusion head, the method comprising the steps of:

a) feeding of the molten material into the extrusion head; and b) lowering of a plunger supporting an ovalizing insert having a substantially annular shape and comprising an asymmetrical bottom edge presenting portions with convex profile and portions with concave profile and set in a chamber made in the bottom part of the force plug of the extrusion head, so that the bottom edge of the ovalizing insert projects at the bottom with respect to the bottom edge of said bottom part of the force plug, to ovalize the internal part of the parison coming out of said extrusion head.

* * * * *